US009237214B2

(12) United States Patent (10) Patent No.: US 9,237,214 B2
Reitalu et al. (45) Date of Patent: Jan. 12, 2016

(54) USER INTERFACE

(75) Inventors: Oliver Reitalu, Saue (EE); Pui Kwan Law, Maidenhead (GB)

(73) Assignee: Skype, Dublin (IE)

( * ) Notice: Subject to any disclaimer, the term of this patent is extended or adjusted under 35 U.S.C. 154(b) by 2060 days.

(21) Appl. No.: 12/148,785

(22) Filed: Apr. 22, 2008

(65) Prior Publication Data

US 2009/0175264 A1 Jul. 9, 2009

(30) Foreign Application Priority Data

Jan. 4, 2008 (GB) .................................. 0800173.7

(51) Int. Cl.
*H04M 1/2745* (2006.01)
*H04M 1/253* (2006.01)
*H04M 1/57* (2006.01)

(52) U.S. Cl.
CPC ........ *H04M 1/27455* (2013.01); *H04M 1/2535* (2013.01); *H04M 1/274583* (2013.01); *H04M 1/576* (2013.01); *H04M 2250/22* (2013.01)

(58) Field of Classification Search
CPC ........... H04W 4/16; H04W 4/02; H04W 4/12; H04W 52/0225; H04M 1/72519; H04M 2250/22; H04M 1/72552; H04M 1/27455
USPC ........... 370/352; 709/217; 455/517, 411, 466, 455/567
See application file for complete search history.

(56) References Cited

U.S. PATENT DOCUMENTS

2001/0029194 A1* 10/2001 Ketola et al. .................. 455/567
2006/0052119 A1* 3/2006 Veen et al. .................... 455/466
2007/0123193 A1 5/2007 Kitada
2008/0088639 A1* 4/2008 Thoresson .................... 345/584
2008/0141149 A1* 6/2008 Yee et al. ...................... 715/764
2008/0282164 A1* 11/2008 Blass et al. .................... 715/719

FOREIGN PATENT DOCUMENTS

WO WO 02/082343 A1 10/2002
WO WO 2005/009019 A2 1/2005
WO WO-2009087119 7/2009

OTHER PUBLICATIONS

Notification of Transmittal of the International Search Report and the Written Opinion of the International Search Authority, or the Declaration, for International Application No. PCT/EP2009/050011, dated May 15, 2009.

* cited by examiner

*Primary Examiner* — Khaled Kassim
(74) *Attorney, Agent, or Firm* — Danielle Johnston-Holmes; Micky Minhas

(57) ABSTRACT

A method of initiating a communication event via a communication system at a communication device comprising storing a plurality of memory items, wherein each memory item is associated with a user of the communication system; selecting a first set of memory items from said plurality of memory items in accordance with a predetermined selection method; displaying the first set of memory items as a first set of icons, wherein each icon represents at least one memory item and receiving a selection signal associated with one of said icons from the user of the communication device to initiate the communication event with the user of the communication system associated with the memory item represented by the selected icon.

27 Claims, 8 Drawing Sheets

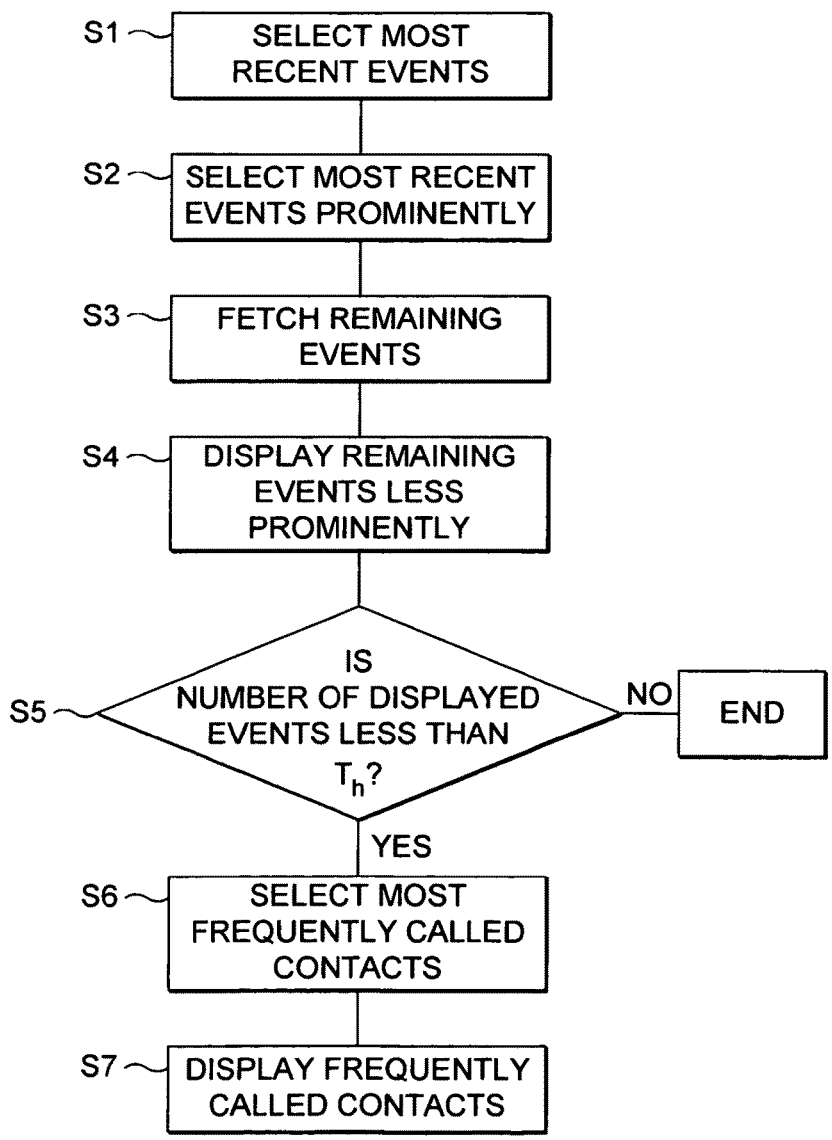

USER INTERFACE

RELATED APPLICATION

This application claims priority under 35 U.S.C. §119 or 365 to Great Britain, Application No. 0800173.7, filed Jan. 4, 2008. The entire teachings of the above application are incorporated herein by reference.

TECHNICAL FIELD

The present invention relates to a user interface for handling a communication event in a communication system. In particular the invention relates, but not exclusively to controlling an interface in a communication system.

BACKGROUND

Voice over internet protocol ("VoIP") communication systems allow the user of a terminal, such as a personal computer, to make telephone calls across a computer network such as the Internet. These systems are beneficial to the user as they are often of significantly lower cost than traditional telephony networks, such as fixed line or mobile networks. This may particularly be the case for long distance calls. To use a VoIP service, the user must install and execute client software on their terminal. The client software provides the VoIP connections as well as other functions such as registration and authentication. In addition to voice communication, the client may also provide video calling and instant messaging ("IM").

One type of VoIP communication system uses a peer-to-peer communication system built on proprietary protocols. To access the peer-to-peer communication system, the user must execute peer to peer client software provided by the operator of the peer to peer system on their user terminal, and register with the peer to peer system. When the user registers with the peer to peer system the client software is provided with a digital certificate from a central server. Once the client software has been provided with the certificate communication can subsequently be set up and routed between users of the peer to peer system without the further use of a central server. Further details on such a peer to system are disclosed in WO 2005/009019.

In a communication system, such as a peer to peer system, the client software installed on an end user terminal such as a personal computer (PC) allows the user of the user terminal to communicate with other users of the communication system. The user interface of the client software can be controlled to display details of other users of the communication system as a list of contacts stored by the user of the user terminal. The client user interface may also be controlled to display a list of recent events such as missed incoming calls or chat messages.

The user may navigate options presented by the client user interface in order to access the contact list and initiate a communication event with user of the communication network listed in the contact list. Alternatively the user may access the list of recent events by selecting an event history option in order to return a missed call or access a chat message.

The inventors of the present invention have identified that the current methods for establishing communication events and receiving recent events are time consuming and are not easily accessible.

It is therefore an aim of embodiments of the invention to reduce the time required to establish a communication event and to receive recent events via the communication system.

SUMMARY

According to a first aspect of the present invention, there is provided a method of initiating a communication event via a communication system at a communication device comprising; storing a plurality of memory items, wherein each memory item is associated with a user of the communication system; selecting a first set of memory items from said plurality of memory items in accordance with a predetermined selection method; displaying the first set of memory items as a first set of icons, wherein each icon represents at least one memory item and receiving a selection signal associated with one of said icons from the user of the communication device to initiate the communication event with the user of the communication system associated with the memory item represented by the selected icon.

According to a second aspect of the invention there is provided a device arranged to initiate a communication event via a communication system comprising; a memory store arranged to store a plurality of memory items, wherein each memory item is associated with a user of the communication system; a selection engine arranged to select a first set of memory items from said plurality of memory items in accordance with a predetermined selection method; a user interface arranged to display the first set of memory items as a first set of icons, wherein each icon represents at least one memory item; and an input arranged to receive a selection signal associated with one of said icons from the user of the communication device to initiate the communication event with the user of the communication system associated with the memory item represented by the selected icon.

BRIEF DESCRIPTION OF THE DRAWINGS

For a better understanding of the present invention and as to how the same may be carried into effect, embodiments of the present invention will now be described with reference to the following drawings:

FIG. 8 is a flow chart illustrating an algorithm according to an embodiment of the invention;

FIG. 9 is a flow chart illustrating an algorithm according to a further embodiment of the invention.

DETAILED DESCRIPTION

Figure 1:
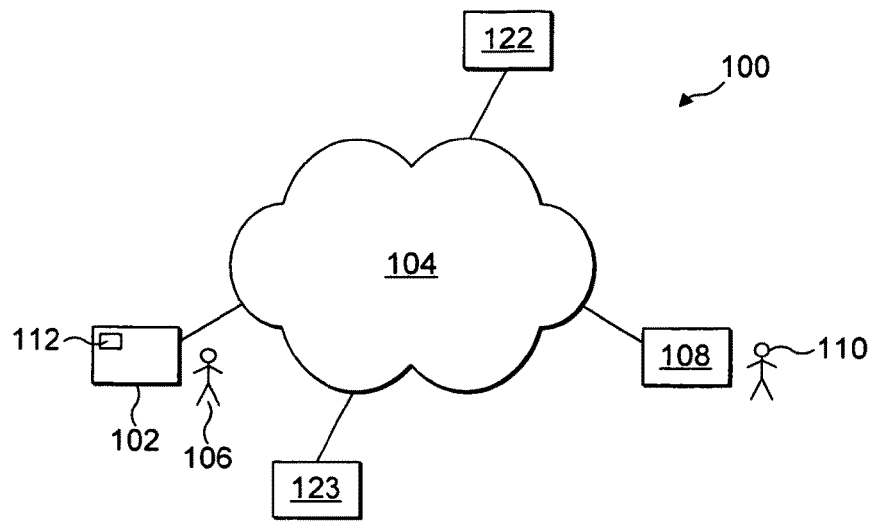
FIG. 1 is a schematic representation of a communication system.

Reference will first be made to FIG. 1, in which is shown a communication system 100. It should be appreciated that even though the exemplifying communication system shown and described in more detail uses the terminology of a peer to peer system, embodiments of the present invention can be used in any other suitable form of communication network and may include multiple types of interconnected communication networks.

A user terminal 102 is shown connected to a network 104. The user terminal may be, for example, a desktop personal computer (PC), a wifi phone, a laptop, an ultra mobile PC (UMPC), a gaming device, a television or other device able to connect to the network 104. The user terminal 102 is connected to the network 104 via a cable (wired) connection or a wireless connection. The network 104 may be a network such as the Internet. The user terminal is arranged to run a client program 112 to enable the terminal to connect to the peer to peer system. The client program 112 is provided by the operator of the peer-to-peer system.

The client 112 is a software program executed on a local processor in the user terminal 102. The client 112 has a number of different components or layers for implementing various functions, including a protocol layer 222 (FIG. 2) for managing the network interface.

Figure 2:
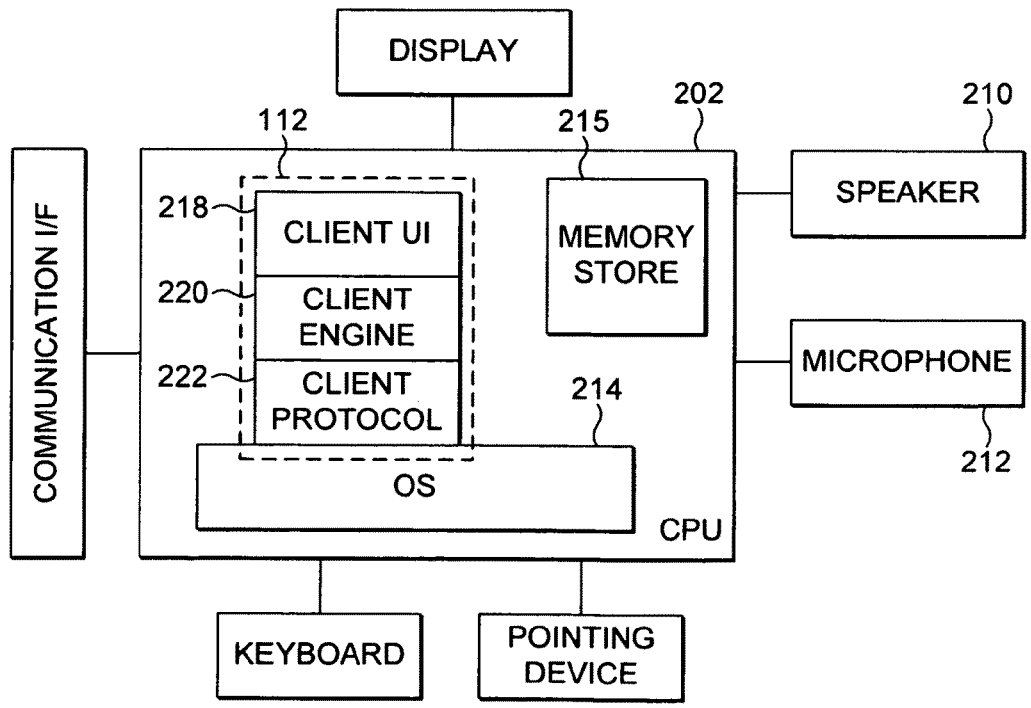
FIG. 2 is a schematic representation of a user terminal according to an embodiment of the present invention.

FIG. 2 illustrates a detailed view of the user terminal 102. The user terminal comprises a central processing unit (CPU) 202 on which the client program 112 is executed. An operating system (OS) 214 is also executed on the CPU 202. The operating system allocates CPU resources such as memory store resources 215 to the client program 112.

The CPU 202 may be connected to interface devices such as a touch screen 204, a keyboard 206, a pointing device 208 such as a mouse, joystick or directional pad, a speaker 210 and a microphone 212. The CPU 202 is also connected to a communication interface 213, which allows the device to connect to the network 104. The communication interface 213 can provide a wireless or wired connection to the network 104.

The client program 112 is arranged as a software stack comprising a client protocol layer 222, a client engine layer 220 and a client user interface (UI) layer 218. Each layer is responsible for specific functions. Because each layer usually communicates with two other layers, they are regarded as being arranged in a stack as shown in FIG. 2. The operating system 214 manages the hardware resources of the device and handles data being transmitted to and from the network via the communication interface 213. The client protocol layer 222 of the client software communicates with the operating system 214 and manages the network connections over the peer to peer system. Processes requiring higher level processing are passed to the client engine layer 220, which handles the processing required for the user to make and receive calls over the peer to peer system. The client engine 220 also communicates with the client user interface layer 318. The client engine 220 may be arranged to control the client user interface layer 218 to present information to and receive information from a user 106 of the user terminal 102 via an interface of the terminal.

Reference is again made to FIG. 1. A contact list network node 122 is connected to the network 104. The contact list network node 122 is arranged to store the contact list associated with the user 106 of the user terminal 102. The contact list network node is also arranged to store contact lists associated with other users of the peer to peer system. The contact list associated with the user 106 defines a list of users of the communication system stored as contacts by the user 106.

When the user of the user terminal logs into the peer to peer system, the client protocol layer 222 is arranged to retrieve the user's contact list from the contact list network node. Information for each contact such as profile information and status information, indicating whether a contact is connected to the peer to peer system, may then be retrieved from the peer to peer system. Profile information may include a profile picture of the contact and date dependent information relating to each contact, for example, date information specifying the contacts birthday, wedding anniversary and such like.

The client engine layer 220 is arranged to store the retrieved contact list and the contacts' profile and status information in the memory store resource 215 allocated to the client program 112 by the operating system 214.

Once the user is logged into the peer to peer system other users of the communication system, including the user's contacts may establish a communication event with the user via the peer to peer system. The communication event may for example comprise a call, an instant message, or a file transfer. This list is not exhaustive. A call may for example comprise a voice call, a video call or a conference call.

When a communication event such as an incoming communication event is signalled via the network to the user terminal, the client protocol layer 222 is arranged to receive the notification from the network 104 and to control the client engine 220 accordingly. The client engine may be arranged to control the client user interface layer 218 to notify the user of the incoming call via the touch screen 204. The user may then accept the incoming call by interacting with an interface device of the terminal, such as the touch screen 204 or the keyboard 206.

However if the user is unable to accept the call because, for example, the user is away from the user terminal or the user is engaged on another call, the client engine is arranged to store the missed call as a recent event in the memory store 215.

Other events which may be stored as recent events in the memory store may include unread instant messages, new voice mail messages, contact requests from users of the network requesting to be added to the contact list and events associated with the user's contacts such as birthday reminders as defined by information stored in the user's contact list. This list is not exhaustive. Types of missed events will be discussed in more detail hereinafter.

Figure 3:
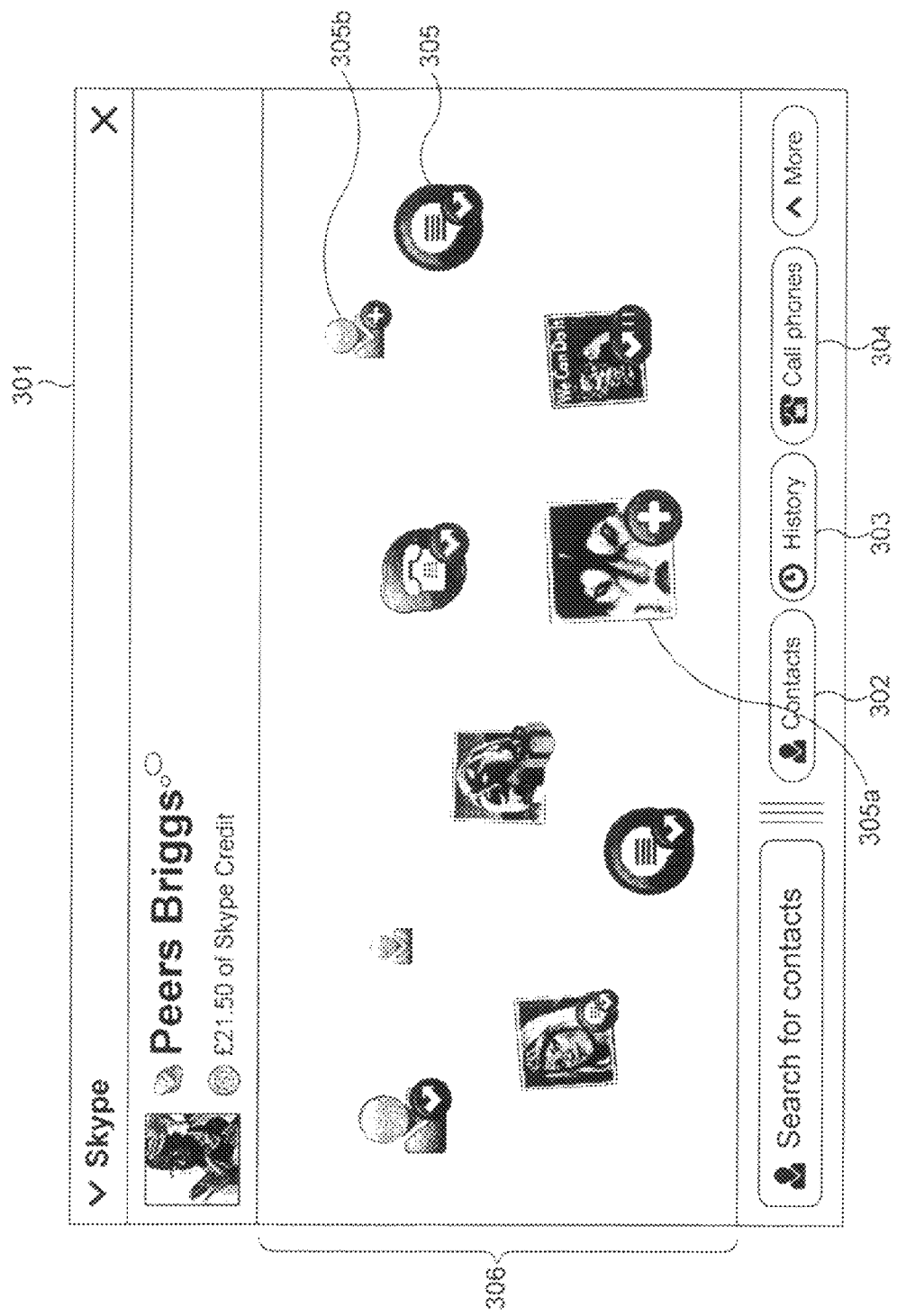
FIG. 3 is a schematic representation of a screen displayed by the client user interface layer according to an embodiment of the present invention.

FIG. 3 shows a screen 301 displayed on the display 204 by the client user interface showing recent events in accordance with an embodiment of the invention. In a preferred embodiment of the invention the screen 301 is a home screen from which function options available to the user may be accessed. For example the home screen may display a contacts button 302 for accessing the user's contact list, a history button 303 for accessing the user's communication event history and a call phones button 304 for dialling a telephone number.

In accordance with an embodiment of the invention the client engine is arranged to select recent events stored in the memory store 215 and to display the recent events on the screen 301. The events may be displayed in a subsection of the screen hereinafter referred to as the events region 306. In a preferred embodiment of the invention the recent events are displayed as icons 305. An icon may relate to a single missed event or to a plurality of missed events from the same caller. The client user interface is arranged to display a plurality of icons in the events region 306 representing the recent events selected from the memory store 215.

As shown in FIG. 1 a second user terminal 108 is connected to the communication system. If the user terminal 108 is connected directly to the internet 104 a user 110 of the user terminal may be identified with a username. Alternatively if the user terminal is located in a PSTN network (Public Switched Telephone Network) connected to the internet via a gateway (not shown), the user of the terminal may be identified with a telephone number.

An icon may relate to a missed call from the user 110 of the user terminal 108 connected to the communication system. If the other user 110 calls the user 106 of the user terminal 102 again, before the previous call has been cleared as a recent event, as will be explained hereinafter, the icon may relate to a plurality of calls from the user 110.

The missed events represented by the icon may be accessed by selecting the icon 305. If the display 204 is a touch screen the user may select the icon by touching the screen in the location where the icon is displayed. Alternatively if a pointing device 208, such as a mouse, is connected to the CPU 202, the user may select the icon by pointing a cursor at the icon using the mouse.

Figure 4:
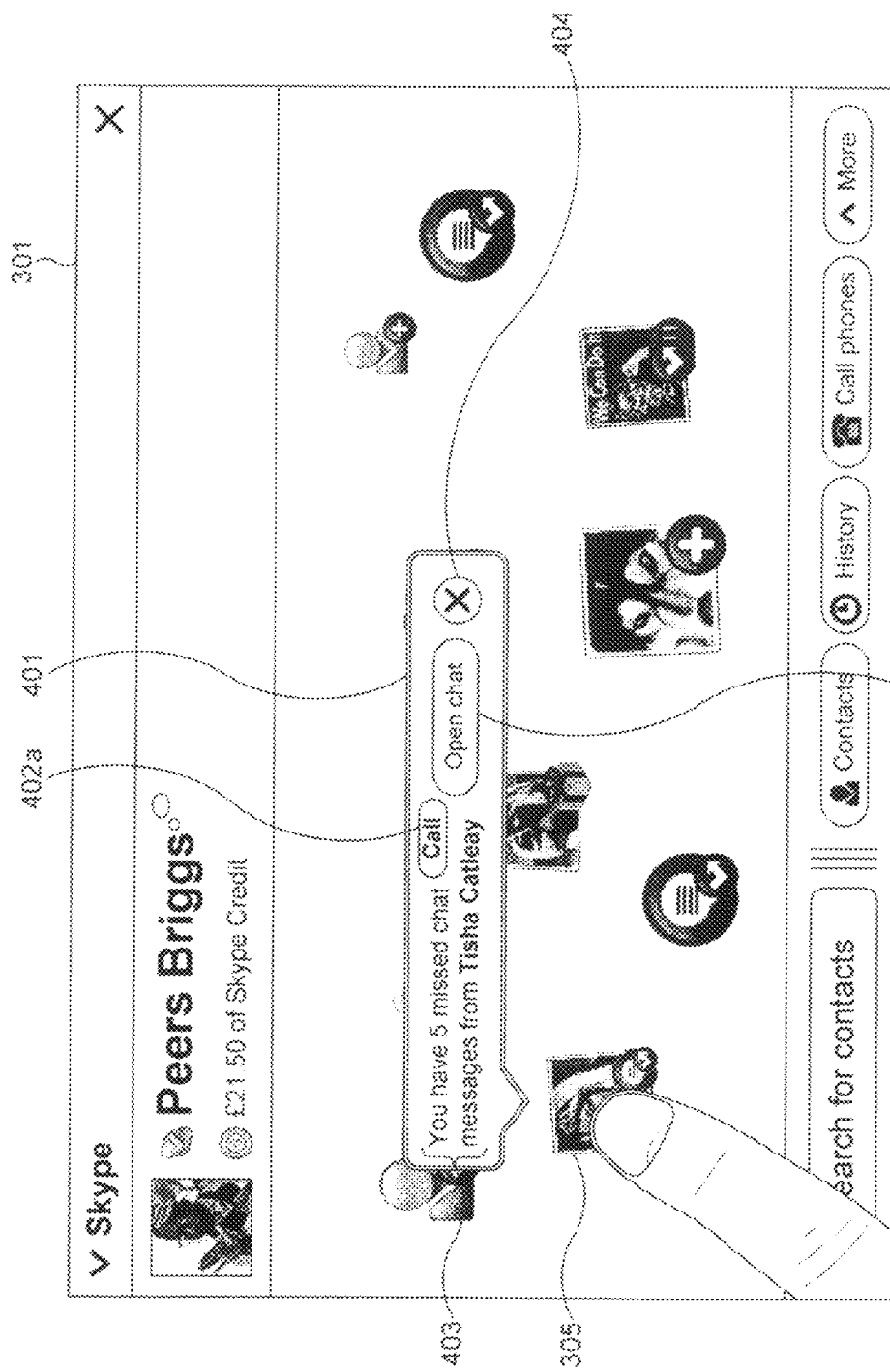
FIG. 4 is a schematic representation of a screen displayed by the client user interface layer according to a further embodiment of the present invention.

FIG. 4 shows the home screen 301 with an icon selected. Selecting an icon 305 causes an action option 402 to be displayed above the icon. As shown in FIG. 4 the action option 402 may displayed in a window 401 together with information 403 relating to the missed event.

Where the icon represents a plurality of missed chat messages from the user 110 of the user terminal 108, the action option 402 may allow the user 106 to open the chat message and access the data transmitted in the chat message. An additional action option 402*a* may also allow the user to initiate a call with the user 110. The user 106 may then reply to the user 110 who transmitted the chat by a return chat message or by placing a voice call to the user 110. The information 403 displayed together with the action option 402 may specify the number of missed chat messages and identify the user that transmitted the chat message. For example the information may state:

'You have 5 missed chat messages from Tisha Catleay'

If the action option 402 is selected and the chat messages are opened the client engine is arranged to remove the chat messages as a recent event from the memory store 215. Accordingly the icon 305 representing the missed chat messages is permanently removed from the events region 306.

The user 106 may chose to close the window 401 without selecting an action option by selecting a close option 404. If the close option is selected the chat messages will remain as a recent event in the memory store. Accordingly the icon will be displayed in the event region 306.

In accordance with an embodiment of the invention two or more other users of the communication network may be involved in a chat with the user 106 of the user terminal 102. This is referred to as a group chat. In this case the icon will be associated with the missed messages transmitted within the group chat.

Where the icon represents a plurality of missed calls from the user 110 of the user terminal 108, the action option 402 may allow the user 106 to place a call or a chat message to the user 110. The information 403 displayed together with the action option 402 may specify the number of missed calls and identify the user 110 that initiated the calls.

According to an embodiment of the invention an icon 305 may also represent a voicemail message. The user 106 may be registered with a voicemail server 123 as shown in FIG. 1. The voice mail server 123 is arranged to store voice mail messages for the user 106. In the case where the user 106 is unable to accept a call because the user is away from the user terminal 102 or because the user 106 is not logged into the peer to peer system the call may be redirected to the voicemail server 123 so that the calling party may store a voice mail message on the voicemail server 123 for the user 106. The method of storing a voice mail message on a voice mail server 123 is known in the art and will not be described further herein.

When a voicemail message is stored on the voicemail server 123 for the user 106 the voicemail server 123 sends a voicemail notification to the user terminal 102.

When a voicemail notification is signalled via the network to the user terminal 102, the client protocol layer 222 is arranged to receive the voicemail notification from the network 104 and to control the client engine 220 to store the voicemail notification as a recent event in the memory store 215. The voicemail notification may then be displayed as an icon 305 in the event region 306 as shown in FIG. 5.

Figure 5:
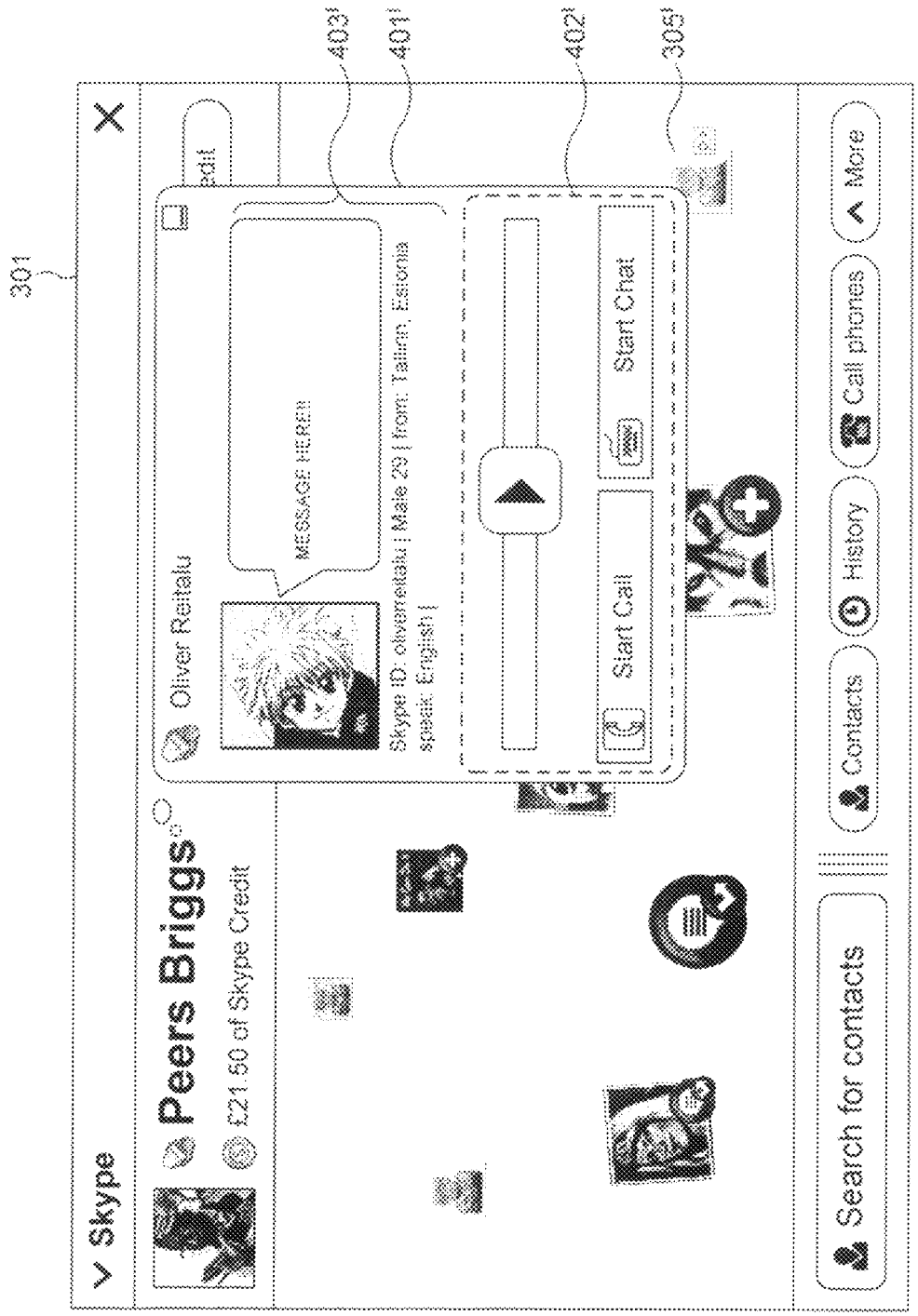
FIG. 5 is a schematic representation of a screen displayed by the client user interface layer according to a further embodiment of the present invention.

FIG. 5 shows the home screen 301 with an icon 305' representing a voicemail notification selected. When the icon represents a voicemail notification the information 403' may identify the user 110 that left the voicemail. The action option 402' may allow the user 106 to start a chat message or a call with the user 110, or to play the voicemail stored at the voicemail server 123.

In accordance with a further embodiment of the invention an icon may represent a contact request from another user requesting to exchange contact details with the user 106. If the user 110 of the user terminal 118 is not a member of the user's 106 contact list the user 110 may transmit a contact request to the user 106 requesting that the details of the user 110 are stored on the user's contact list. In accordance with an embodiment of the invention, if the user terminal 102 receives a contact request from the user 110 of the user terminal 108 the client engine 220 running on the user terminal 102 is arranged to store the contact request as a recent event in the memory store 215. The contact request may then be represented as an icon displayed in the event region 306 of the home page 301 as shown in FIG. 6.

Figure 6:
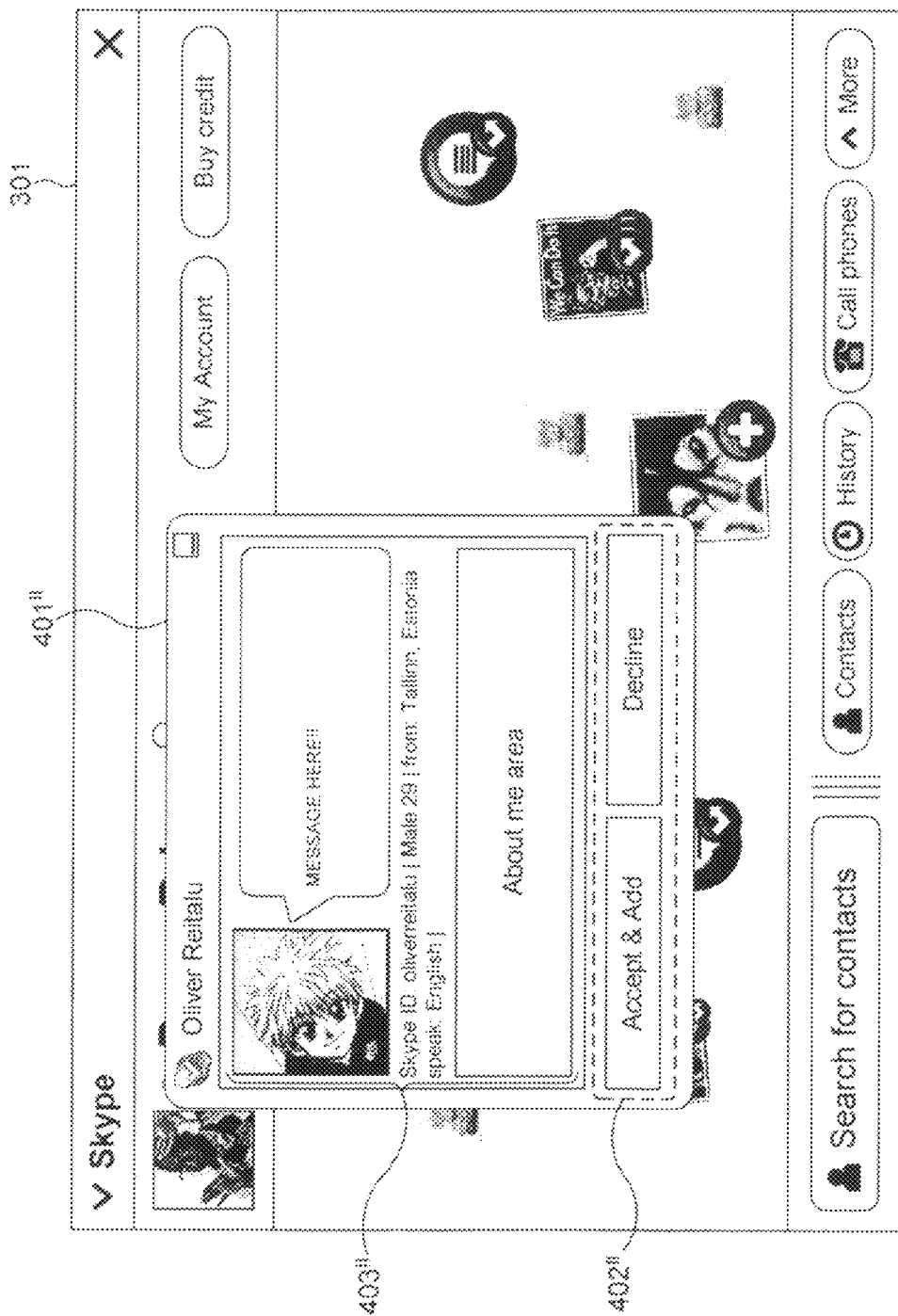
FIG. 6 is a schematic representation of a screen displayed by the client user interface layer according to a further embodiment of the present invention.

FIG. 6 shows the home screen 301 with an icon representing a contact request selected. When the icon represents a contact request the information 403" displayed in the window 401" may identify the user 110 that sent the contact request. The action option 402" may allow the user 106 to accept the contact request from the user 110 and to share contact details with the user, or to decline the contact request and not share contact details with the user 110.

Where an icon represents a file transfer request from the user 110 of the user terminal 108, the action options may allow the user 106 to accept the file transfer, decline the file transfer, to place a call to the user or send a chat message to the user 110. The information displayed together with the action option may specify the number of file transfers and identify the user 110 that is requesting to send the files.

In accordance with a further embodiment of the invention, contacts listed in the user's contact list may be displayed as icons in the events region 306. The client engine 220 is arranged to select contacts from the user's contact list stored in the memory store 215 and to control the client user interface 218 to display the selected contacts as icons in the events region 306. When the icon represents a contact in the user's contact list the user may select the icon to initiate a communication event with the contact, such as a chat message, a call, a voicemail or an SMS (short message service).

Figure 7:
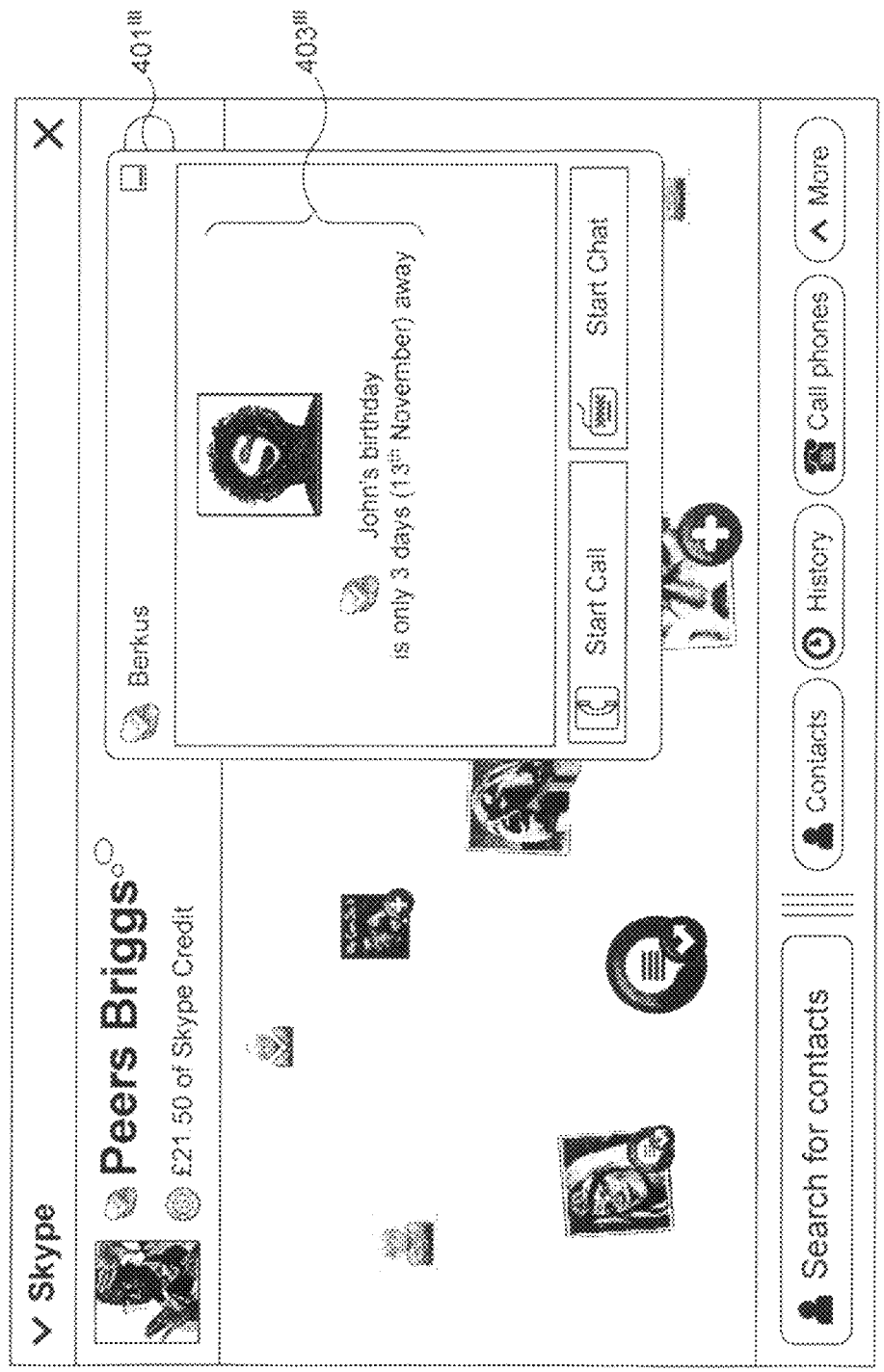
FIG. 7 is a schematic representation of a screen displayed by the client user interface layer according to a further embodiment of the present invention.

In accordance with a further embodiment of the invention, date dependent information relating to the user's contacts may be displayed as an icon in the events region 306. As shown in FIG. 7, date dependent information such as the date of a birthday or other event may be retrieved by the client engine from the profile information stored in the memory store 215 and displayed by the client user interface as an icon. In accordance with an embodiment of the present invention the client user interface 218 may be arranged to display the icon for a predetermined length of time before the date of the event, for example two days before the event. As shown in FIG. 7 the icon relates to a contacts birthday. The information 403''' displayed in the window 401''' identifies the contact, the event and the date of the event. The information may also specify the number of days today's date is before the event. For example the information may state:

'John's birthday is only 3 days (13$^{th}$ November) away'

In accordance with an embodiment of the invention the client engine 220 is arranged to control the client user interface to display icons relating to selected recent events and/or contacts more prominently in the events region 306 than icons representing other recent events and/or contacts. For example some icons may be displayed more prominently than other icons by increasing the size in which they are displayed in the events region. As shown in FIG. 3, some icons such as icon 305a are displayed as larger icons than other icons such as icon 305b.

The icons 305, 305a, 305b may be arranged to appear and disappear from the event region 306. In one embodiment of the invention the icons are arranged to move across the screen appearing as the icons emerge from one side of the events region 306 and disappearing as the icons move off of the opposite side of the events region 306. The icon may again appear at a later time by emerging again in the events region 306. Alternatively the icons may appear and disappear by temporarily appearing at a static location in the events region. Selected icons may be displayed more prominently by increasing the frequency that the icons are arranged to appear in the events region.

In one embodiment of the invention, icons displayed in the events region may be displayed to be less prominent than other icons by displaying the icons as transparent icons.

FIG. 8 illustrates the steps of an algorithm used to display icons in the events region according to one embodiment of the present invention.

In step s1 the client engine 220 selects the most recent events from the memory store 215 by determining which events occurred within a predetermined time limit, for example those occurring in the last 24 hours.

In step s2 the client engine 220 is arranged to control the client user interface 218 to display the selected events as icons in the events region 306.

In an alternative embodiment of the invention the client engine may be arranged to select the most frequently called contacts stored in the memory store 215 to be displayed as icons in the events region 306.

FIG. 9 illustrates the steps of an algorithm used to display icons in the events region according to a further embodiment of the present invention.

In step s1 the client engine 220 selects the most recent events from the memory store 215 by determining which events occurred within a predetermined time, for example those occurring in the last 24 hours.

In step s2 the client engine 220 is arranged to control the client user interface 218 to display the selected events as the most prominent icons in the events region 306.

In step s3 the client engine 220 fetches the remaining recent events from the memory store 215.

In step s4 the client engine 2220 is arranged to control the client user interface 218 to display the remaining events as icons that are less prominent than the icons representing the most recent events.

In step s5 the client engine 220 may determine if there are less than a predetermined number of displayed icons. If there are less than the predetermined number the algorithm will continue to step s6.

In step s6 the client engine may also be arranged to select the most frequently called contacts in the user's contact list from the memory store 215.

In step s7 the client engine may be arranged to control the client user interface 218 to display the selected contacts as icons in the events region 306.

In one embodiment of the invention the client engine will limit the number of contacts selected in s6 such that only a predetermined number of icons are selected to be displayed.

In an alternative embodiment of the invention the client engine 220 may be arranged to select events from the memory store 215 in dependence on the type of event. For example in step s1 of the algorithm described with reference to FIG. 9 the client engine may be arranged to select missed calls and missed chats from the memory to be displayed as the most prominent icons. Other events such as birthdays, and contacts, may be displayed as smaller icons in the events region 306.

In accordance with one embodiment of the invention a weighting value may assigned to items in the memory store 215 to determine how the icons representing each item are to be displayed. This embodiment is described with reference to FIG. 10.

Figure 10:
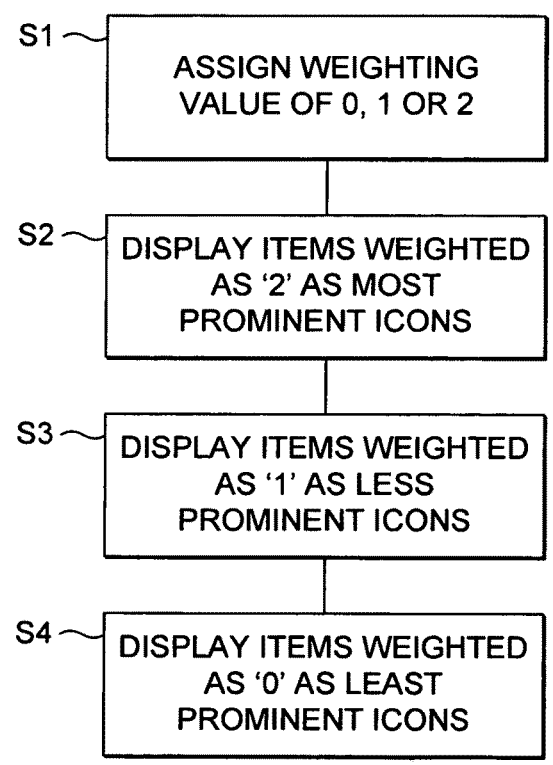
FIG. 10 is a flow chart illustrating an algorithm according to a further embodiment of the invention.

As shown in FIG. 10, In step 1 the client engine is arranged to assign a weighting value of 0, 1 or 2 to each item stored in the memory store.

In the case where the item is a missed call, a missed chat message or a voice mail, the weighting value is assigned in dependence on the age of the event. The most recent events are assigned a weighting value of 2, the less recent events are assigned a weighting value of 1 and the oldest events are assigned a weighting value of 0.

If the item is a reminder, the weighting value is assigned in dependence on the urgency of the reminder. Reminders for events that are occurring first are assigned a weighting value of 2, reminders for events that are occurring later are assigned a weighting value of 1 and reminders for events that are occurring even later are assigned a weighting value of 0.

If the item is a contact of the user's contact list, the weighting value is assigned in dependence on the number of communication events with the contact. If the number of communication events with the contact is above a first threshold value the contact is assigned a weighting value of 2. If the number of communication events with the contact is below the first threshold value and above a second threshold value the contact is assigned a weighting value of 1. If the number of communication events with the contact are below the second threshold value the contact is assigned a weighting value of 0.

In step 2 the client engine is arranged to control the client user interface 218 to display the items that are assigned a weighting value of 2 as prominent icons. As described previously the prominence of an icon may be controlled by controlling the size of the icon or the frequency that the icon is displayed.

In step 3 the client engine is arranged to control the client user interface to display the items that are assigned a weighting value of 1 as less prominent icons.

In one embodiment of the invention the items assigned a weighting value of 0 are not displayed. In an alternative embodiment of the invention in s4 the client engine may control the client user interface to display the items assigned a weighting value of 0 as the least prominent icons.

In one embodiment of the invention the number of icons displayed in the events region is limited. For example, the number of icons displayed in the events region may be limited by limiting the number of items that are assigned a high weighting value.

While this invention has been particularly shown and described with reference to preferred embodiments, it will be understood to those skilled in the art that various changes in form and detail may be made without departing from the scope of the invention as defined by the claims.

What is claimed is:

1. A method of initiating a communication event via a communication system at a communication device comprising:
    storing a plurality of memory items that are individually associated with different respective users of the communication system;
    selecting a first set of memory items from said plurality of memory items in accordance with a predetermined selection method, including:
        assigning a weighting value of multiple possible weighting values to individual memory items of the plurality of memory items, weighting values for respective memory items being based on at least one of an age of a memory item, an urgency of a memory item, or a number of communication events associated with a memory item; and
        selecting the first set of memory items based on memory items that meet or exceed a predetermined threshold weighting value;
    displaying the first set of memory items as a first set of icons as part of a graphical user interface of a communication client that interfaces with the communication system, each icon representing at least one memory item, the first set of icons being displayed more prominently than icons associated with others of the plurality of memory items based on weighting values for memory items of the first set of memory items exceeding weighting values for the others of the plurality of memory items;
    displaying a visual indicator at least partially overlaying an icon of the first set of icons, the visual indicator representing a specific type of one or more of a communication event or a date dependent event that is associated with the respective memory item;
    receiving an indication of a user selection of the icon;
    responsive to said receiving, displaying a plurality of action options corresponding to different types of communication events related to the icon;
    receiving an indication of a user selection of one of the action options; and
    initiating within the communication client a communication event associated with the selected action option with a user of the communication system associated with a particular memory item represented by the icon such that the communication event is performed by utilizing a communication function within the communication client.

2. A method as claimed in claim 1 wherein a memory item comprises one of a missed communication event, an event reminder or a contact in a contact list associated with the user of the communication device.

3. A method as claimed in claim 2 wherein a communication event comprises a chat message, a call, a voicemail notification, a file transfer request or a contact request.

4. A method as claimed in claim 1 wherein if the memory item is a missed communication event the weighting value assigned to the memory item is dependent on the age of the event.

5. A method as claimed in claim 1 wherein if the memory item is an event reminder the weighting value is dependent on the urgency of the event.

6. A method as claimed in claim 1 wherein if the memory item is a contact the weighting value is dependent on the number of communication events between the user of the communication device and the contact.

7. A method as claimed in claim 1 wherein the method further comprises displaying a second set of memory items as a second set of icons.

8. A method as claimed in claim 7 wherein the method further comprises selecting the second set of memory items based on weighting values assigned to individual memory items of the second set.

9. A method as claimed in claim 7 wherein the step of selecting the second set of memory items comprises selecting memory items having a weighting value below the predetermined threshold.

10. A method as claimed in claim 7 wherein the first set of icons are displayed more prominently than the second set of icons.

11. A method as claimed in claim 7 wherein the first set of icons are displayed more frequently than the second set of icons.

12. A method as claimed in claim 7 wherein the first set of icons are displayed as larger icons than the second set of icons.

13. A method as claimed in claim 7 wherein the second set of icons are displayed to be more transparent than the first set of icons.

14. A method as claimed in claim 1 wherein the particular memory item is removed from a memory store after the indication of the user selection of the one of said icons is received.

15. A method as claimed in claim 1 wherein the action option comprises an option to retrieve a voicemail associated with the particular memory item represented by the selected icon.

16. A method as claimed in claim 1 wherein the action option comprises an option to accept or decline a request from a particular user of the communication system.

17. A method as claimed in claim 1 wherein the user of the communication system is defined by at least one username or a telephone number.

18. A device arranged to initiate a communication event via a communication system comprising:
    a memory store arranged to store a plurality of memory items that are individually associated with different respective contacts;
    a selection engine arranged to select a first set of memory items from said plurality of memory items in accordance with a predetermined selection method, including:
        assigning a weighting value of multiple possible weighting values to individual memory items of the plurality of memory items, weighting values for respective memory items being based on at least one of an age of a memory item, an urgency of a memory item, or a number of communication events associated with a memory item; and
        selecting the first set of memory items based on memory items that meet or exceed a predetermined threshold weighting value;
    a user interface associated with a communication client that interfaces with the communication system, the user interface arranged to display the first set of memory items as a first set of icons, a particular icon of the first set of icons displaying, independent of a user interaction with the particular icon, a visual indication of a respective contact and being at least partially overlaid by a visual indication of a particular type of communication event or date dependent event associated with the respective contact and associated with a respective memory item, the first set of icons being displayed more prominently than icons associated with others of the plurality of memory items based on weighting values for memory items of the first set of memory items exceeding weighting values for the others of the plurality of memory items; and an input device arranged to receive an indication of a user selection of the particular icon to initiate, within the communication client, a communication event with a user of the communication system associated with a particular memory item represented by the particular icon such that the communication event is performed by utilizing a communication function within the communication client.

19. A device as claimed in claim 18 wherein a location in the user interface in which individual icons of the first set of icons are displayed depends on weighting values assigned to respective memory items.

20. A device as claimed in claim 18 wherein the user interface is further arranged to display a second set of memory items as a second set of icons.

21. A device as claimed in claim 20 wherein the selection engine is further arranged to select the second set of memory items by selecting memory items having a weighting value below the predetermined threshold.

22. A device as claimed in claim 20 wherein the user interface is further arranged to display the first set of icons more prominently than the second set of icons.

23. A computer program product stored on a storage device and comprising program code means which when executed by a computer implement the steps according to the method of claim 1.

24. A device as claimed in claim 18 wherein the user interface is further arranged to
responsive to said receiving of an indication of a user selection of one of the icons, display a plurality of action options that correspond to different communication events; and receive an indication of a user selection of a one of the action options;
wherein the initiated the communication event is associated with the selected action option.

25. A device as claimed in claim 24 wherein the action option comprises an option to accept or decline a request from a particular user of the communication system.

26. A system comprising:
one or more processors; and
a memory storing program code that is executable by the one or more processors to cause the system to perform operations as part of a communication system, the operations including:
storing a plurality of memory items that are individually associated with different respective users of the communication system;
selecting a memory item from the plurality of memory items in accordance with a predetermined selection method, including:
assigning a weighting value of multiple possible weighting values to individual memory items of the plurality of memory items, weighting values for respective memory items being based on at least one of an age of a memory item, an urgency of a memory item, or a number of communication events associated with a memory item; and
selecting the memory item based on the memory item meeting or exceeding a predetermined threshold weighting value;
displaying a set of icons as part of a graphical user interface of a communication client that interfaces with the communication system, each icon representing at least one memory item, including displaying a first icon that represents the memory item more prominently than a second icon that represents a different memory item of the plurality of memory items based on a weighting value for the memory item exceeding a weighting value for the different memory item;
displaying a visual indicator at least partially overlaying the first icon, the visual indicator representing a specific type of one or more of a communication event or a date dependent event that is associated with the memory item;
receiving an indication of a user selection of the first icon;
responsive to said receiving, displaying a plurality of action options corresponding to different types of communication events related to the first icon;
receiving an indication of a user selection of one of the action options; and
initiating within the communication client a communication event with a user of the communication system represented by the first icon, the communication event associated with the selected action option and performed by utilizing a communication function within the communication client.

27. A system as claimed in claim 26 wherein the operations further include:
selecting a set of memory items that includes others of the memory items by selecting memory items having a weighting value below the predetermined threshold; and
displaying icons for the set of memory items less prominently than the first icon based on the respective memory items of the set of memory items having a weighting value below the predetermined threshold.

* * * * *